United States Patent [19]
Fischer et al.

[11] 3,899,598
[45] Aug. 12, 1975

[54] FORTIFIED GELATING DESSERT POWDER AND PROCESS

[75] Inventors: Valentine J. Fischer, Katonah; George Bernard Ponzoni, Spring Valley; Charles J. Tressler, White Plains, all of N.Y.

[73] Assignee: General Foods Corporation, White Plains, N.Y.

[22] Filed: Feb. 15, 1974

[21] Appl. No.: 442,995

[52] U.S. Cl. .................... 426/73; 426/72; 426/168; 426/350; 426/311; 426/380
[51] Int. Cl. .............................................. A23l 1/30
[58] Field of Search ....... 426/168, 72, 73, 350, 380, 426/311

[56] References Cited
UNITED STATES PATENTS

| | | | |
|---|---|---|---|
| 2,987,444 | 6/1961 | Allardice | 426/450 X |
| 3,218,176 | 11/1965 | Polya et al. | 426/168 |
| 3,558,323 | 1/1971 | Cannalonga et al. | 426/168 X |

*Primary Examiner*—Raymond N. Jones
*Attorney, Agent, or Firm*—Thomas R. Savoie; Bruno P. Struzzi

[57] ABSTRACT

A method for producing fruit-flavored gelatin dessert compositions containing both adipic and fumaric acids and which are fortified with vitamin A, vitamin C and iron has been developed. Vitamin C, which may be coated with a gum, is dry-blended with a vitamin A/iron/sucrose mixture. The gelatin is combined with fumaric acid prior to being blended with the fortifying ingredients and other mix components.

9 Claims, No Drawings

FORTIFIED GELATING DESSERT POWDER AND PROCESS

BACKGROUND OF THE INVENTION

The present invention relates to the production of fortified gelatin-dessert powders which are substantially free from adverse browning reactions.

There are three general types of browning reactions found in food. One of these, namely chemical browning which is the reaction between a carbonyl and amino compounds, more commonly known as the Maillard reactions, has long been considered a factor in the preparation of gelatin dessert powders. Chemical browning is to be distinguished from enzymatic browning and browning due to pyrolysis (caramelization or organic decomposition due to heat) and is characterized by a chemical reaction between aldehydes, ketones and reducing sugars with amines, amino acids, peptides and protein. Maillard reaction browning is particularly troublesome in the area of gelatin-containing powders since the amine groups of the gelatin are available for reaction with the reactive carbonyl groups which are found in many commonly used food ingredients. Conventional anti-browning agents, such as sodium metabisulfite having generally not been employed due to off-flavor produced by the sulfur.

It has previously been recognized as set forth in U.S. Pat. No. 3,218,176 that the browning tendency of gelatin dessert powders, typically comprised of sugar, gelatin, food acid, buffer salt, flavor and color, can be diminished by the use of fumaric acid which will lower the pH of the dessert imgredients relative to other acids such as adipic acid. This patent also found that the browning resistance of gelatin dessert powders can be maintained through the use of fumaric acid in combination with adipic acid at levels of 10 to 35% by weight fumaric acid and 65 to 90% by weight adipic acid, a preferred level being about 25% by weight fumaric and 75% by weight adipic. It has, however, still not been thought practical to produce gelatin dessert powder which contains such reactive components as vitamin C and iron. Further, due to its poor solubility and/or dispersibility in water, vitamin A has not previously been considered as a fortifying ingredient for gelatin dessert powders.

DESCRIPTION OF THE INVENTION

The present invention relates to a process for preparing a gelatin dessert powder containing a combination of adipic and fumaric acid as the acidulent and which contains as fortifying ingredients vitamic C and iron and which preferably also contains vitamin A. As an initial step in this process, a premix of the fortifying ingredients is prepared, care being taken to isolate any component which would interact with or promote reactions between other ingredients.

Preferably, the vitamin C (ascorbic acid) is encapsulated in a hydrocolloid material such as gum arabic, larch gum, Irish moss, carrageehan, etc. Spray drying an aqueous solution of vitamin C with a minor amount of the hydrocolloid is a convenient means for achieving encapsulation. Hydrocolloids, such as gelatin, which have free amine groups are not suitable for coating vitamin C because of the tendency of reaction between the amine group of the gelatin with the carbonyl group present in vitamin C. Encapsulation of vitamin C is desirable in order to improve the dispersibility of the material during dry blending and to assist in keeping the vitamin C out of contact with the gelatin component of the powdered dessert mix.

It has also been found desirable to maintain or fix the source of assimilable iron out of contact with vitamin C and other mix components and/or atmospheric water and moisture. The iron source will be a water soluble iron salt such as ferrous sulfate, ferrous fumarate, ferrous gluconate. It is preferred to coat the iron salt by dry blending the salt material with nonreducing sugars such as sucrose. Usually, in order to promote encapsulation and/or coating, the sugar will be in the powdered or fine granular state and will be used in an amount at least about five times as large as the iron. It has been found, however, that the non-reducing sugar material should be essentially anhydrous which, as used in this invention, is meant to imply a moisture content of less than about 0.5%. Fixation of the iron by means of spray drying a solution of the iron and fixative would also be acceptable; however, care would have to be exercised to avoid oxidation of the iron salt during the spray drying process.

Vitamin A is included in the vitamin-iron premix in the form of spray-dried particles which may be added as a separate component of the premix or which may be combined with the iron salt prior to encapsulation in the non-reducing sugar. Although vitamin A is catergorized as an oil soluble vitamin, some slight solubility in water is present. Spray drying an aqueous vitamin A solution will produce solid particles which will easily dissolve or disperse in water, such as when a gelatin dessert is being prepared from the powdered mix.

Other vitamin and/or mineral ingredients may be added to the vitamin-iron premix prepared for use in this invention or a separate component of the dessert mix. These additional materials may be added to fulfill a particular dietary need; however, compatibility with the other components of the product would a prerequisite.

Any interaction between the gelatin component and any other component of the dessert mix such as the carbonyl-containing vitamin C ingredient is further minimized by first coating the gelatin with fumaric acid. This can be readily achieved by dry blending these two ingredients in a premix. In order to effect uniform coating of the gelatin, the fumaric acid material should be in a finely ground condition, having particle sizes less than 30 mesh (U.S. Standard Sieve) and preferably less than about 60 mesh.

Fumaric acid is relatively insoluble in aqueous solutions and is non-hygroscopic. Once coated onto gelatin, the acid will tend to physically protect the gelatin from contact with other ingredients and, since fumaric acid is a relatively strong acid (i.e. producing low pH solutions) when moisture does get into the dry mix, the pH at the gelatin surface is lowered sufficiently to reduce the incidence of chemical browning.

Once the gelatin has been coated with fumaric acid other mix ingredients such as sucrose, the vitamin-iron premix, buffer salts, flavor and colors may be added. Adipic acid should, however, be added last so that the amount of contact between adipic acid and the fumaric coated gelatin is minimized. If adipic acid were to be added early in the blending sequence, the time during which the adipic acid is mixed with the fumaric coated gelatin would be excessively long.

As will be familiar to those skilled in the art, all of the dry blending operations required for the process of this invention will be performed to achieve optimum homogeneity; accordingly, particle size of the dry components and blending time may be controlled to achieve this goal. The necessity for moisture-proof containers for the finished product of this invention will also be familiar to those skilled in the art.

The invention may be further described by means of the following example.

| Ingredient | Weight % |
|---|---|
| Sucrose | 88.3808 |
| Gelatin (220 Bloom) | 8.0 |
| Adipic Acid | 1.87 |
| Trisodium Citrate | 0.875 |
| Fumaric Acid | 0.582 |
| Vitamin C (gum arabic coated) | 0.0925 |
| Ferrous Sulfate | 0.0193 |
| Vitamin A | 0.0154 |
| Flavors | 0.129 |
| Color | 0.036 |

The above ingredients were combined into a strawberry flavored gelatin dessert mix according to the following procedure. Ferrous sulfate and spray-dried particles of vitamin A were dry blended with 0.1% by weight of the sucrose component. Spray-dried particles of vitamin C encapsulated in gum arabic were added to and blended with the foregoing blend to form the vitamin-iron premix. The gelatin and fumaric acid were dry blended and then combined with the remainder of the sucrose. To this blend was added in sequence the vitamin premix, trisodium citrate buffer, flavor, color and lastly adipic acid.

The term "adipic acid," as employed in this specification is meant to include adipic acid and its acid salts; likewise the term, "fumaric acid," is intended to include fumaric acid and its acid salts which are water-soluble under the conditions of dessert mix use.

What is claimed is:

1. Method for preparing a powdered, fortified gelatin dessert mix comprising the steps of:
    a. dry blending gelatin and finely ground fumaric acid in order to effect coating of the gelatin with fumaric acid, said acid having a particle size less than 30 U.S. mesh,
    b. blending sucrose, buffer salts, flavor, color and a vitamin premix with the gelatin-fumaric acid blend, said vitamin premix conntaining vitamin C, and then
    c. dry blending adipic acid with the blend obtained from step b), the adipic-fumaric acid weight being from 10 to 35% fumaric acid and 65 to 90% adipic acid.

2. The method of claim 1 wherein the vitamin premix contains an assimilable, water-soluble iron salt coated with an anhydrous, non-reducing sugar.

3. The method of claim 2 wherein the non-reducing sugar is sucrose.

4. The method of claim 3 wherein the iron salt is ferrous sulfate.

5. The method of claim 2 wherein the vitamin premix contains particles of vitamin A obtained by spray drying an aqueous solution of vitamin A.

6. The method of claim 5 wherein the vitamin A particles and iron salt are simultaneously coatd with the non-reducing sugar.

7. The method of claim 6 wherein the non-reducing sugar is sucrose.

8. The product produced by the method of claim 7.

9. The process of claim 2 wherein the vitamin C is encapsulated in a hydrophilic colloid which does not contain a free amine group.

* * * * *

UNITED STATES PATENT OFFICE
CERTIFICATE OF CORRECTION

Patent No. 3,899,598          Dated   August 12, 1975

Inventor(s)  Valentine J. Fischer et al.

It is certified that error appears in the above-identified patent and that said Letters Patent are hereby corrected as shown below:

On the cover page, in the title of the patent, change "GELATING" to -- GELATIN -- .

In column 1, line 1, change "GELATING" to -- GELATIN -- ; line 26, change "having" to -- have --.

In column 2, line 36, after "or" insert -- as -- .

In column 4, line 9 of claim 1, change "conntaining" to -- containing -- .

In column 4, line 2 of claim 6, change "coatd" to -- coated -- .

Signed and Sealed this twenty-third Day of December 1975

[SEAL]

Attest:

RUTH C. MASON
*Attesting Officer*

C. MARSHALL DANN
*Commissioner of Patents and Trademarks*